(12) United States Patent
Park et al.

(10) Patent No.: US 9,191,087 B2
(45) Date of Patent: *Nov. 17, 2015

(54) METHODS AND SYSTEMS FOR PRECODER SELECTION ASSISTED BY DEMODULATION REFERENCE SIGNALS (DM-RS)

(71) Applicant: Telefonaktiebolaget L M Ericsson (publ), Stockholm (SE)

(72) Inventors: Chester Park, Santa Clara, CA (US); Ali Behravan, Stockholm (SE); Havish Koorapaty, Saratoga, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/175,318

(22) Filed: Feb. 7, 2014

(65) Prior Publication Data

US 2014/0219376 A1   Aug. 7, 2014

Related U.S. Application Data

(63) Continuation of application No. 13/193,041, filed on Jul. 28, 2011, now Pat. No. 8,649,423.

(60) Provisional application No. 61/412,830, filed on Nov. 12, 2010.

(51) Int. Cl.
*H04B 7/04* (2006.01)
*H04B 7/06* (2006.01)

(52) U.S. Cl.
CPC ............ *H04B 7/0456* (2013.01); *H04B 7/0413* (2013.01); *H04B 7/0617* (2013.01); *H04B 7/0626* (2013.01)

(58) Field of Classification Search
CPC ...................................................... H04B 7/0626
USPC ........................................ 375/267, 367, 224
See application file for complete search history.

(56) References Cited

U.S. PATENT DOCUMENTS

| 8,649,423 | B2 * | 2/2014 | Park et al. ................ 375/224 |
| 2007/0211815 | A1 | 9/2007 | Pan et al. |
| 2010/0238824 | A1 | 9/2010 | Farajidana et al. |

FOREIGN PATENT DOCUMENTS

| EP | 2408131 A1 | 1/2012 |
| WO | 2010068153 A1 | 6/2010 |
| WO | 2010103886 A1 | 9/2010 |

OTHER PUBLICATIONS

International Search Report of the International Searching Authority in corresponding International Application No. PCT/IB2011/054961 mailed Feb. 16, 2012.

Written Opinion of the International Searching Authority in corresponding International Application No. PCT/IB2011/054961 mailed Feb. 16, 2012.

* cited by examiner

*Primary Examiner* — Michael Neff
(74) *Attorney, Agent, or Firm* — Patent Portfolio Builders PLLC (57) ABSTRACT

Systems and methods according to these exemplary embodiments provide for using demodulation reference signals (DM-RSs) to obtain channel state information (CSI) for precoder selection. A method includes: receiving a DM-RS in at least one subframe, determining the CSI from the DM-RS; and using the CSI to perform at least one function.

13 Claims, 9 Drawing Sheets

| CODEBOOK INDEX | NUMBER OF LAYERS $\upsilon$ | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | - |
| 2 | $\frac{1}{\sqrt{2}}\begin{bmatrix}1\\j\end{bmatrix}$ | - |
| 3 | $\frac{1}{\sqrt{2}}\begin{bmatrix}1\\-j\end{bmatrix}$ | - |
| 4 | $\frac{1}{\sqrt{2}}\begin{bmatrix}1\\0\end{bmatrix}$ | - |
| 5 | $\frac{1}{\sqrt{2}}\begin{bmatrix}0\\1\end{bmatrix}$ | - |

FIG. 1
BACKGROUND ART

| CODEBOOK INDEX | NUMBER OF LAYERS $\upsilon$ | | | |
|---|---|---|---|---|
| | 1 | 2 | 3 | 4 |
| 0 | $\frac{1}{2}\begin{bmatrix}1\\1\\1\\-1\end{bmatrix}$ | $\frac{1}{2}\begin{bmatrix}1&0\\1&0\\0&1\\0&-j\end{bmatrix}$ | $\frac{1}{2}\begin{bmatrix}1&0&0\\1&0&0\\0&1&0\\0&0&1\end{bmatrix}$ | $\frac{1}{2}\begin{bmatrix}1&0&0&0\\0&1&0&0\\0&0&1&0\\0&0&0&1\end{bmatrix}$ |
| 1 | $\frac{1}{2}\begin{bmatrix}1\\1\\j\\j\end{bmatrix}$ | $\frac{1}{2}\begin{bmatrix}1&0\\1&0\\0&1\\0&j\end{bmatrix}$ | $\frac{1}{2}\begin{bmatrix}1&0&0\\-1&0&0\\0&1&0\\0&0&1\end{bmatrix}$ | - |
| 2 | $\frac{1}{2}\begin{bmatrix}1\\1\\-1\\1\end{bmatrix}$ | $\frac{1}{2}\begin{bmatrix}1&0\\-j&0\\0&1\\0&1\end{bmatrix}$ | $\frac{1}{2}\begin{bmatrix}1&0&0\\0&1&0\\1&0&0\\0&0&1\end{bmatrix}$ | - |
| 3 | $\frac{1}{2}\begin{bmatrix}1\\1\\-j\\-j\end{bmatrix}$ | $\frac{1}{2}\begin{bmatrix}1&0\\-j&0\\0&1\\0&-1\end{bmatrix}$ | $\frac{1}{2}\begin{bmatrix}1&0&0\\0&1&0\\-1&0&0\\0&0&1\end{bmatrix}$ | - |
| 4 | $\frac{1}{2}\begin{bmatrix}1\\j\\1\\j\end{bmatrix}$ | $\frac{1}{2}\begin{bmatrix}1&0\\-1&0\\0&1\\0&-j\end{bmatrix}$ | $\frac{1}{2}\begin{bmatrix}1&0&0\\0&1&0\\0&0&1\\1&0&0\end{bmatrix}$ | - |
| 5 | $\frac{1}{2}\begin{bmatrix}1\\j\\j\\1\end{bmatrix}$ | $\frac{1}{2}\begin{bmatrix}1&0\\-1&0\\0&1\\0&j\end{bmatrix}$ | $\frac{1}{2}\begin{bmatrix}1&0&0\\0&1&0\\0&0&1\\-1&0&0\end{bmatrix}$ | - |
| 6 | $\frac{1}{2}\begin{bmatrix}1\\j\\-1\\-j\end{bmatrix}$ | $\frac{1}{2}\begin{bmatrix}1&0\\j&0\\0&1\\0&1\end{bmatrix}$ | $\frac{1}{2}\begin{bmatrix}0&1&0\\1&0&0\\0&0&1\\0&0&1\end{bmatrix}$ | - |
| 7 | $\frac{1}{2}\begin{bmatrix}1\\j\\-j\\-1\end{bmatrix}$ | $\frac{1}{2}\begin{bmatrix}1&0\\j&0\\0&1\\0&-1\end{bmatrix}$ | $\frac{1}{2}\begin{bmatrix}0&1&0\\1&0&0\\-1&0&0\\0&0&1\end{bmatrix}$ | - |
| 8 | $\frac{1}{2}\begin{bmatrix}1\\-1\\1\\1\end{bmatrix}$ | $\frac{1}{2}\begin{bmatrix}1&0\\0&1\\1&0\\0&1\end{bmatrix}$ | $\frac{1}{2}\begin{bmatrix}0&1&0\\1&0&0\\0&0&1\\1&0&0\end{bmatrix}$ | - |
| 9 | $\frac{1}{2}\begin{bmatrix}1\\-1\\j\\-j\end{bmatrix}$ | $\frac{1}{2}\begin{bmatrix}1&0\\0&1\\1&0\\0&-1\end{bmatrix}$ | $\frac{1}{2}\begin{bmatrix}0&1&0\\1&0&0\\0&0&1\\-1&0&0\end{bmatrix}$ | - |

FIG. 2
BACKGROUND ART

| CODEBOOK INDEX | NUMBER OF LAYERS υ | | | |
|---|---|---|---|---|
| | 1 | 2 | 3 | 4 |
| 10 | $\frac{1}{2}\begin{bmatrix}1\\-1\\-1\\-1\end{bmatrix}$ | $\frac{1}{2}\begin{bmatrix}1&0\\0&1\\-1&0\\0&1\end{bmatrix}$ | $\frac{1}{2}\begin{bmatrix}0&1&0\\0&0&1\\1&0&0\\1&0&0\end{bmatrix}$ | - |
| 11 | $\frac{1}{2}\begin{bmatrix}1\\-1\\-j\\j\end{bmatrix}$ | $\frac{1}{2}\begin{bmatrix}1&0\\0&1\\-1&0\\0&-1\end{bmatrix}$ | $\frac{1}{2}\begin{bmatrix}0&1&0\\0&0&1\\1&0&0\\-1&0&0\end{bmatrix}$ | - |
| 12 | $\frac{1}{2}\begin{bmatrix}1\\-j\\1\\-j\end{bmatrix}$ | $\frac{1}{2}\begin{bmatrix}1&0\\0&1\\0&1\\1&0\end{bmatrix}$ | - | - |
| 13 | $\frac{1}{2}\begin{bmatrix}1\\-j\\j\\-1\end{bmatrix}$ | $\frac{1}{2}\begin{bmatrix}1&0\\0&1\\0&-1\\1&0\end{bmatrix}$ | - | - |
| 14 | $\frac{1}{2}\begin{bmatrix}1\\j\\-1\\-j\end{bmatrix}$ | $\frac{1}{2}\begin{bmatrix}1&0\\0&1\\0&1\\-1&0\end{bmatrix}$ | - | - |
| 15 | $\frac{1}{2}\begin{bmatrix}1\\j\\-j\\1\end{bmatrix}$ | $\frac{1}{2}\begin{bmatrix}1&0\\0&1\\0&-1\\-1&0\end{bmatrix}$ | - | - |
| 16 | $\frac{1}{2}\begin{bmatrix}1\\0\\1\\0\end{bmatrix}$ | - | - | - |
| 17 | $\frac{1}{2}\begin{bmatrix}1\\0\\-1\\0\end{bmatrix}$ | - | - | - |
| 18 | $\frac{1}{2}\begin{bmatrix}1\\0\\j\\0\end{bmatrix}$ | - | - | - |
| 19 | $\frac{1}{2}\begin{bmatrix}1\\0\\-j\\0\end{bmatrix}$ | - | - | - |
| 20 | $\frac{1}{2}\begin{bmatrix}0\\1\\0\\1\end{bmatrix}$ | - | - | - |

METHODS AND SYSTEMS FOR PRECODER SELECTION ASSISTED BY DEMODULATION REFERENCE SIGNALS (DM-RS)

RELATED APPLICATIONS

This application is a continuation of U.S. patent application Ser. No. 13/193,041, filed on Jul. 28, 2011, entitled "METHODS AND SYSTEMS FOR PRECODER SELECTION ASSISTED BY DEMODULATION REFERENCE SIGNALS (DM-RS)", which is related to, and claims priority from, U.S. Provisional Patent Application No. 61/412,830, filed on Nov. 12, 2010, entitled "PRECODER SELECTION ASSISTED BY DM-RS", the disclosure of which is incorporated here by reference.

TECHNICAL FIELD

The present invention relates generally to communications and in particular to precoder selection.

BACKGROUND

During the past years, the interest in using mobile and landline/wireline computing devices in day-to-day communications has increased. Desktop computers, workstations, and other wireline computers currently allow users to communicate, for example, via e-mail, video conferencing, and instant messaging (IM). Mobile devices, for example, mobile telephones, handheld computers, personal digital assistants (PDAs), etc., also allow users to communicate via e-mail, video conferencing, IM, and the like. Mobile telephones have conventionally served as voice communication devices, but through technological advancements they have recently proved to be effective devices for communicating data, graphics, etc. Wireless and landline technologies continue to merge into a more unified communication system, as user demand for seamless communications across different platforms increases, which in turn creates more usage, and leads to more services and system improvements. Additionally, these communication systems can evolve into new generations or partial generations of communication systems.

For example, one such evolved network is based upon the Universal Mobile Telephone System (UMTS) which is an existing third generation (3G) radiocommunication system that is evolving into High Speed Packet Access (HSPA) technology. Yet another example is the introduction of another air interface technology within the UMTS framework, e.g., the so-called Long Term Evolution (LTE) technology.

Regarding the air interface for high-speed wireless communications, multiple input multiple output (MIMO) antennas are often used. MIMO can provide both diversity gain and multiplexing gain. MIMO can enable the simultaneous transmission of multiple streams of data with each stream being called a layer. The number of transmit antennas, receive antennas, and layers can be denoted by $N_T$, $N_R$, and R, respectively, with R never being greater than $N_T$, and $N_R$ usually being greater than or equal to $N_T$ for the uplink (but not necessarily the downlink).

Figure 1:
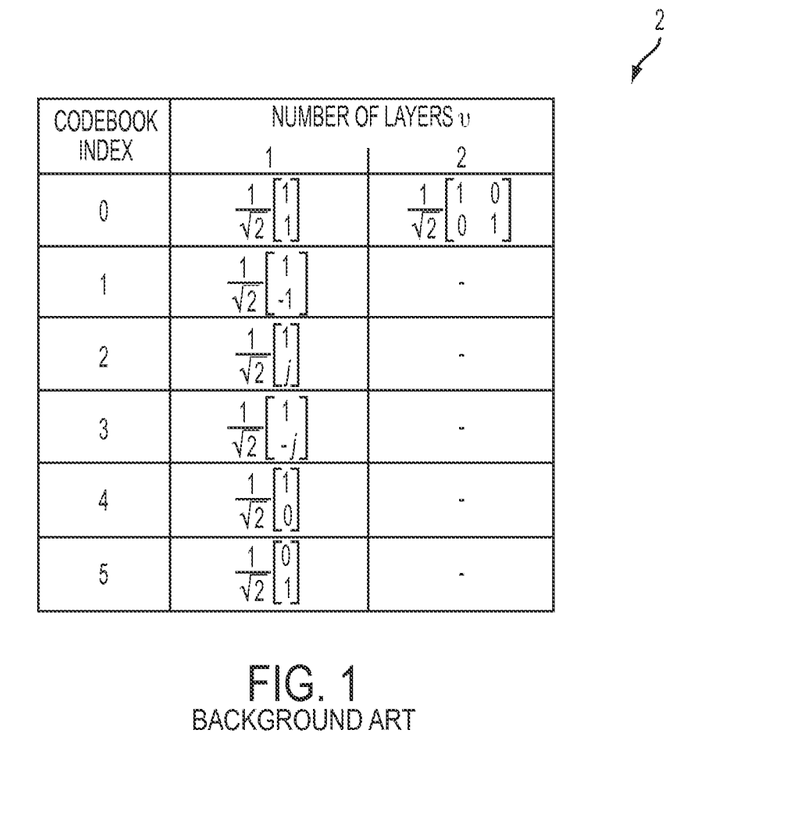
FIG. 1 is a codebook for a two transceiver system.
Figure 3:
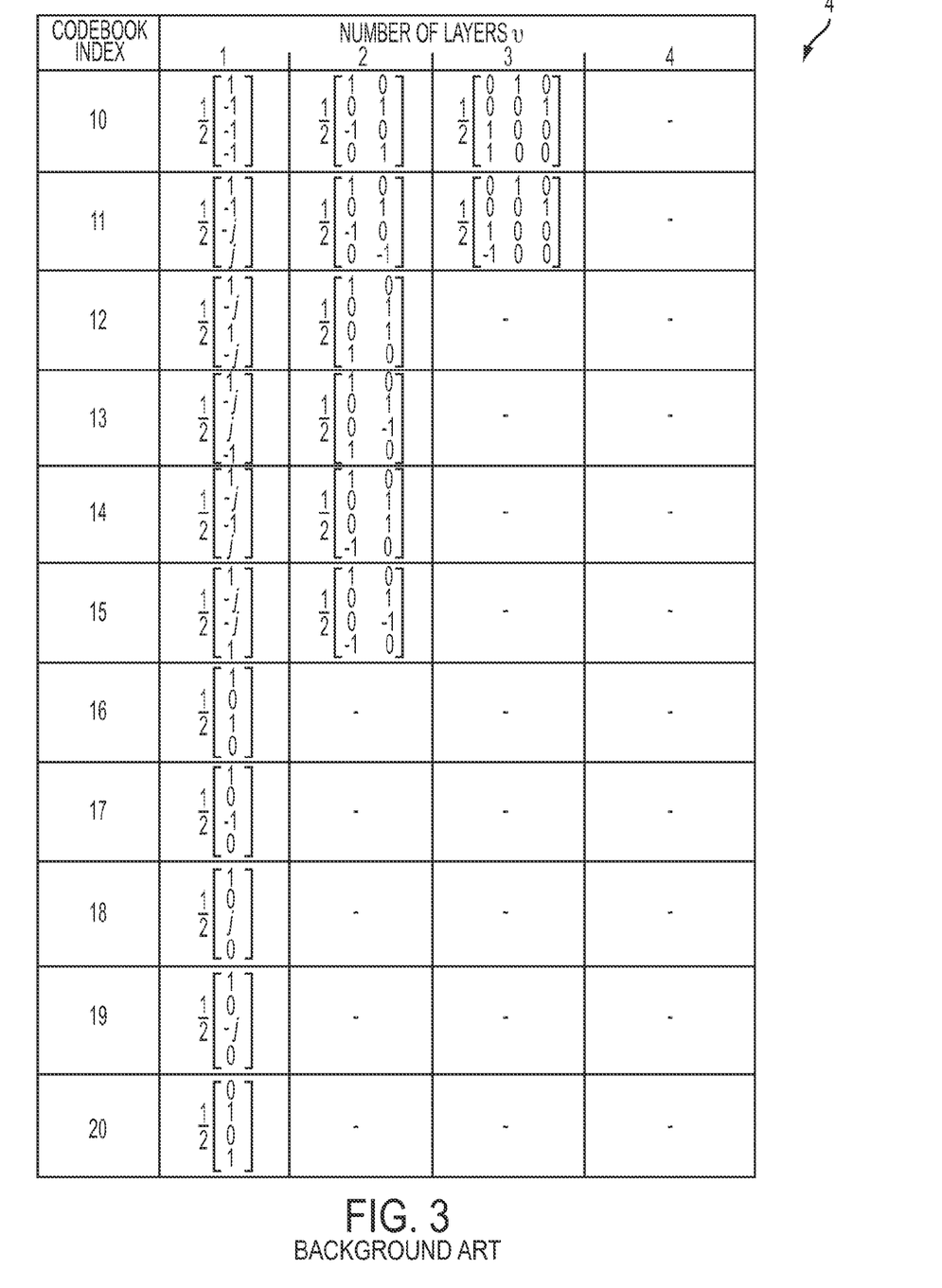
Figure 4:
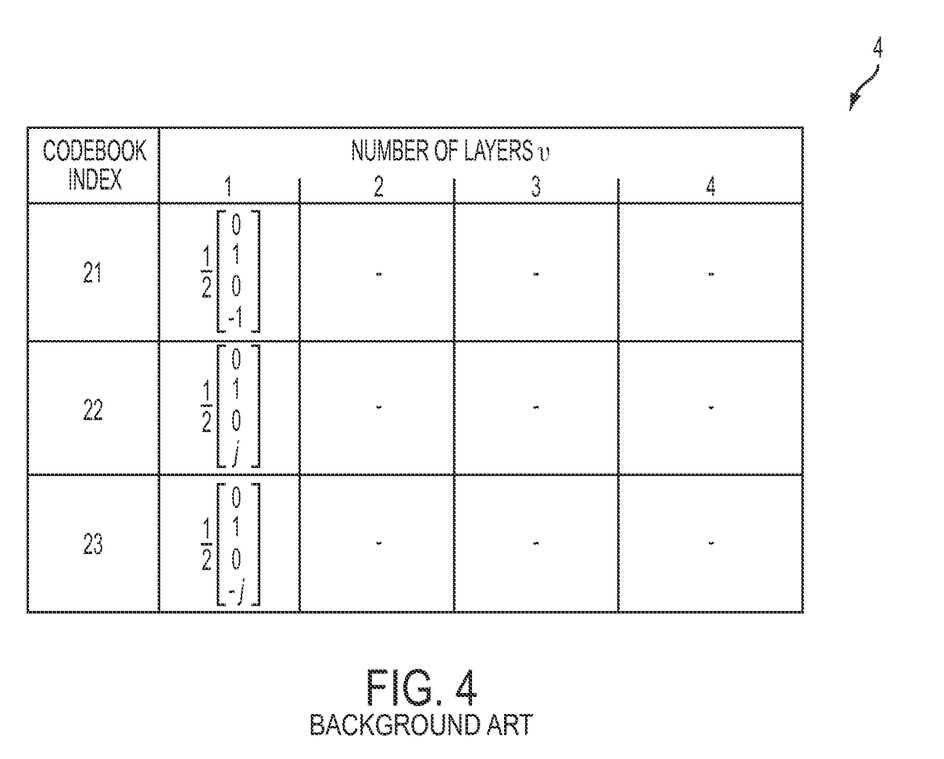

MIMO typically assumes the use of a precoder, which is mathematically expressed as a left multiplication of a layer signal vector (R×1) by a precoding matrix ($N_T$×R), which can be chosen from a pre-defined set of matrices. These pre-defined sets of matrices are also known as so-called codebooks, examples of which can be seen in FIGS. 1-4 with FIG. 1 showing a codebook 2 for a two transceiver system and FIGS. 2-4 showing a codebook 4 for a four transceiver system. (Note that the r-th column vector of the precoding matrix represents the antenna spreading weight of the r-th layer.)

The precoding matrix usually includes linearly independent columns, and thus R is referred to as the rank of the codebook. One aspect of using this kind of precoder for transmitting signals is to match the precoding matrix with the channel state information (CSI) so as to increase the received signal power and also, to some extent, reduce inter-layer interference, thereby improving the signal-to-interference-plus-noise ratio (SINR) of each layer. Consequently, the precoder selection is improved when the transmitter knows the channel properties. In general, the more accurate the CSI that the transmitter obtains, the better the precoder match.

LTE uses orthogonal frequency division multiplexing (OFDM) in the downlink and discrete Fourier transform (DFT)-spread OFDM in the uplink. Sounding reference signals (SRS) are used by the base station to obtain information about the uplink channel, i.e., in the transmit direction from a mobile station or UE toward a NodeB. The basic principle behind sounding is that the UE periodically transmits a wideband signal according to a configuration sent from the NodeB to the UE. Since the SRS is known by the NodeB it can be used to calculate a CSI for the UE's uplink channel which in turn can be used by various RRM-related algorithms such as scheduling, link adaptation and power control. However, the CSI obtained from SRS can, in some cases, deviate from the radio channel more than is desirable.

Accordingly, it would be desirable to have other methods and systems to obtain the CSI for use in, for example, precoder selection.

SUMMARY

Exemplary embodiments relate to systems and methods for demodulation reference signals (DM-RSs). Advantages according to at least some embodiments described herein include, for example, performing precoder selection without requiring the additional overhead of sounding reference signals (SRS) transmissions, i.e., one symbol of a subframe, which implies that one symbol is saved for physical uplink shared channel (PUSCH) transmission, thereby leading to higher throughput. However, it will be appreciated by those skilled in the art that such advantages are not to be construed as limitations of the present invention except to the extent that they are explicitly recited in one or more of the appended claims.

According to one exemplary embodiment, there is a method for using demodulation reference signals (DM-RSs) to obtain channel state information (CSI) for precoder selection. The method includes receiving a DM-RS in at least one subframe, determining the CSI from the DM-RS, and using the CSI to perform at least one function.

According to one exemplary embodiment, there is a base station for using demodulation reference signals (DM-RSs) to obtain channel state information (CSI) for precoder selection. The base station includes a transceiver configured to receive a DM-RS in at least one subframe, and a processor configured to determine the CSI from the DM-RS, the processor being configured to use the CSI to perform at least one function.

BRIEF DESCRIPTION OF THE DRAWINGS

The accompanying drawings illustrate exemplary embodiments, wherein:

FIGS. 2-4 illustrate a codebook for a four transceiver system;

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims. The following embodiments are discussed, for simplicity, with regard to the terminology and structure of Long Term Evolution (LTE) systems. However, the embodiments to be discussed next are not limited to LTE systems but may be applied to other wireless telecommunications systems, e.g., Wideband Code Division Multiple Access (WCDMA), Worldwide Interoperability for Microwave Access (WiMax), Ultra Mobile Broadband (UMB), Global System for Mobile Communications (GSM) and wireless local area network (WLAN), and their associated nodes as applicable. Additionally, terminologies such as NodeB, eNB, base station and user equipment (UE) should be considered exemplary and not be considered limiting.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

As described in the Background section, the channel state information (CSI) obtained from sounding reference signal (SRS) can, in some cases, deviate from the actual radio channel conditions more than is desirable and, accordingly, it would be desirable to have methods and systems to improve the CSI. Prior to describing exemplary embodiments, a long-term evolution (LTE) network for supporting exemplary embodiments is now described with respect to FIGS. 5 and 6.

Figure 5:
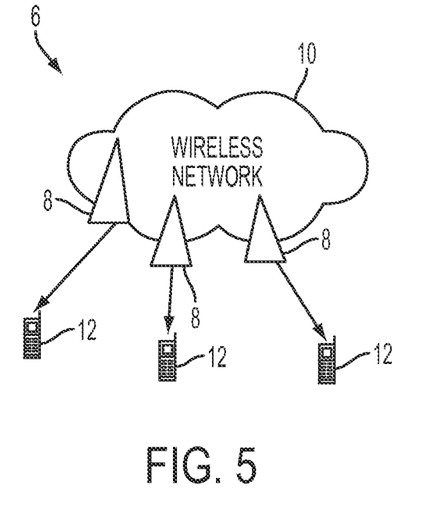
FIG. 5 shows a long-term evolution (LTE) network according to exemplary embodiments.

FIG. 5 shows an exemplary telecommunication system, e.g., an LTE network 6. The LTE network 6 includes a plurality of base stations 8 connected to a core network 10 and connected to a plurality of user equipments (UEs) 12 via the LTE air interface. The term "base station" is used herein as a generic term. As will be appreciated by those skilled in the art, in the LTE architecture an evolved NodeB (eNodeB) may correspond to the base station, i.e., a base station is a possible implementation of the eNodeB. However, the term "eNodeB" (eNB) is also broader in some senses than the conventional base station since the eNodeB refers, in general, to a logical node. The term "base station" is used herein as inclusive of a base station, a NodeB, an eNodeB or other access point nodes specific for other architectures.

Figure 6:
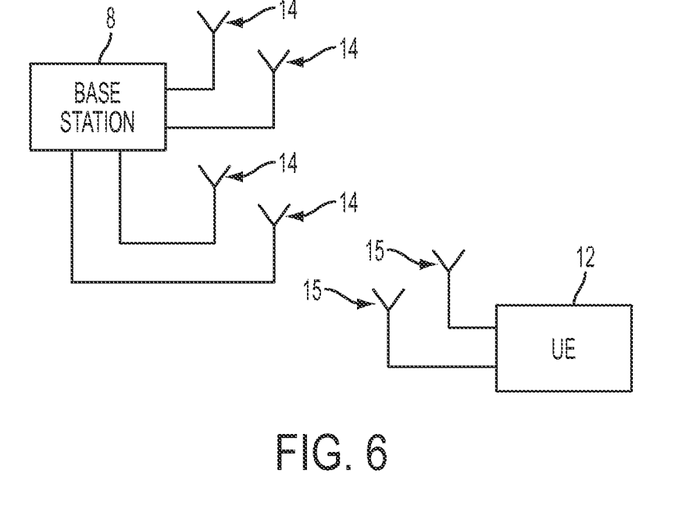
FIG. 6 shows a base station and a user equipment (UE) with respect to their transceivers according to exemplary embodiments.

FIG. 6 shows the base station 8 and UE 12 in more detail with respect to their antennas which can be used in high-speed wireless communications. To increase the transmission rate of the systems, and to provide additional diversity against fading on the radio channels, modern wireless communication systems include transceivers that use multi-antennas, often referred to as a multiple input multiple output (MIMO) systems as mentioned above. More specifically, FIG. 6 shows a base station 8 having four antennas 14 and a UE 12 having two antennas 14. The number of antennas shown in FIG. 6 is exemplary and is not intended to limit the actual number of antennas used at the base station 8 or at the UE 12 in the exemplary embodiments to be discussed below.

In the case of LTE uplink (UL), decisions on the transmission modes including precoder selection (which is a part of link adaptation and which includes not only rank selection but precoding matrix selection hereafter) are made by the receiver, e.g., a NodeB, so that there is no need for CSI feedback to the transmitter in the UE 12. Instead it is necessary for the receiver to obtain CSI, which can usually be facilitated by having the UE transmit a known signal to the eNodeB and then to instruct the UE 12 accordingly regarding its uplink transmissions. In the case of LTE UL, DM-RS and SRS are defined for this purpose. Both DM-RS and SRS are defined in the frequency domain and derived from a Zadoff-Chu sequence. However, since DM-RS is precoded, while SRS is not precoded, the CSI obtained from DM-RS is the equivalent channel that the R layers experience, not the physical channel that the $N_T$ antennas experience. Mathematically, by looking at a certain subcarrier and letting the $N_R \times N_T$ physical channel matrix, the $N_T \times R$ precoding matrix, and the $N_R \times R$ equivalent channel be denoted by H, W and E, respectively, it follows that:

$$E = HDW \qquad (1)$$

where D is the $N_T \times N_T$ diagonal matrix whose diagonal elements represent the inter-antenna imbalance (the additive noise and the subcarrier index are omitted in equation (1) for simplicity).

If there is no inter-antenna imbalance, D is equal to the $N_T \times N_T$ identity matrix. Using the above notation, the CSI obtained from DM-RS and SRS can be expressed as E and HD, respectively. Therefore since the equivalent channel is generally different from the physical channel, except for the case where W is an identity matrix, the received DM-RS does not always provide complete knowledge of the physical channel, while the received SRS does, at least for the instant in time at which it is received.

Thus, conventionally, precoder selection for the UE's uplink transmission is based on a CSI derived from the received SRS since SRS is not precoded as opposed to DM-RS which is precoded. However, the CSI obtained from SRS is more likely to deviate from the equivalent channel seen by the UE on the PUSCH than the CSI from the DM-RS. This can occur because SRS is typically transmitted less frequently than DM-RS, e.g., SRS is typically transmitted once per frame and DM-RS is typically transmitted twice per subframe, and thus SRS is more sensitive to time variations of the channel.

Another reason that this can occur is that SRS and PUSCH may experience a different transmit power, for instance, when their bandwidths are different due to inaccurate power control. This inaccuracy of power control can be caused by different power control methods used for SRS and PUSCH, i.e., D from equation (1) may change between SRS and PUSCH. By way of contrast DM-RS does not have the inaccurate power control problem since DM-RS has the same bandwidth as PUSCH and DM-RS does not have a power offset, i.e., D from equation (1) remains constant between DM-RS and PUSCH.

In certain wireless communication systems, DM-RS may need to be transmitted for demodulation of PUSCH in every subframe (two symbols per subframe), regardless of configuration of the NodeB. Moreover, DM-RS tends to provide more reliable CSI as mentioned above.

According to exemplary embodiments, DM-RS can be used either by itself, or with SRS, for precoder selection (as well as demodulation) including rank and precoding matrix which can reduce SRS overhead as well as provide a more reliable CSI as compared to the conventional use of SRS only. According to an embodiment, also referred to as "SRS Avoidance" in this specification, a NodeB (or similar node depending upon the communication system) uses the CSI obtained from one or more subframes of received DM-RS signaling, i.e., one or more equivalent channels, in order to obtain complete or partial knowledge of the physical channel and perform link adaptation including precoder selection. Using this exemplary method, it may take some number of subframes until the NodeB can acquire a certain level of knowledge of the physical channel. According to an exemplary embodiment, the time to acquire the required level of knowledge of the physical channel can be reduced by forcing a UE to follow a specific precoder pattern when it is transmitting the DM-RS.

According to one SRS avoidance embodiment, the codebook shown in FIG. 1 can be used beginning with the assumption, for this purely illustrative example, that the DM-RS is precoded with the $0^{th}$ rank-1 precoding matrix, $1/\text{sqrt}(2)*[1\ 1]^T$ at the current subframe. Then, assuming that D in (1) is equal to an identity matrix, the equivalent channel E can be expressed as follows:

$$E\_1 = 1/\text{sqrt}(2)*(h\_1 + h\_2) \quad (2)$$

where $h\_1$ and $h\_2$ represent the first and second column of H, respectively. Therefore, for this example, the knowledge about H, i.e., $h\_1$ and $h\_2$, is incomplete. Thus it is not possible to directly predict the SINR or throughput corresponding to all of the precoding matrices in the codebook. For example, it is impossible to obtain the equivalent channel of the 4-th rank-1 precoding matrix, $1/\text{sqrt}(2)*[1\ 0]^T$.

However, if the DM-RS is precoded with the 1-th rank-1 precoding matrix, $1/\text{sqrt}(2)*[1\ -1]^T$, in the next subframe, it is possible to obtain the physical channel by collecting the equivalent channels obtained from the DM-RSs of the two subframes. In detail, the equivalent channel of this precoding matrix is expressed as follows:

$$E2 = 1/\text{sqrt}(2)*(h\_1 - h\_2) \quad (3)$$

From this it can be seen that $$h\_1 = 1/\text{sqrt}(2)*(E1 + E2) \quad (4)$$

and $$h\_2 = 1/\text{sqrt}(2)*(E1 - E2) \quad (5)$$

i.e., the physical channel H is obtained from the two equivalent channels E1 and E2.

Mathematically, this can be explained as follows. Denoting the n-th precoding matrix and the equivalent channel by $W\_n$ and $E\_n$, respectively, and assuming that D is an identity matrix it follows from equation (1) that:

$$(E_1 E_2 \ldots E_N) = H(W_1 W_2 \ldots W_N) \quad (6)$$

with the additive noise being omitted from equation (6) for simplicity. Continuing with this example, it is assumed that the DM-RS is precoded with N precoding matrices ($W\_n$) and all of the equivalent channels ($E\_n$) are collected by the NodeB. The issue of obtaining the physical channel (H) can then be seen as the estimation of H for a given E_n and W_n. An example of a least-square estimation where H can be obtained is shown in equation (7).

$$\hat{H} = (E_1 E_2 \ldots E_N)(W_1 W_2 \ldots W_N)^+ \quad (7)$$

(Note: $(.)^+$ represents the pseudo inverse of the matrix).

In the previous example N=2 which leads to $$(W_1\ W_2\ \ldots\ W_N) = \frac{1}{\sqrt{2}}\begin{pmatrix} 1 & 1 \\ 1 & -1 \end{pmatrix} \quad (8)$$

and $$(W_1\ W_2\ \ldots\ W_N)^+ = \frac{1}{\sqrt{2}}\begin{pmatrix} 1 & 1 \\ 1 & -1 \end{pmatrix} \quad (9)$$

Therefore, according to exemplary embodiments, if the rank of the collected precoding matrices ($W\_1\ W\_2\ \ldots\ W\_N$) is greater than or equal to the number of transmit antennas, it is possible to obtain the physical channel from the collected equivalent channels ($E\_1\ E\_2\ \ldots\ E\_N$). This is an example of one of the criteria for precoder selection which can be determined in an adaptive manner.

Figure 7:
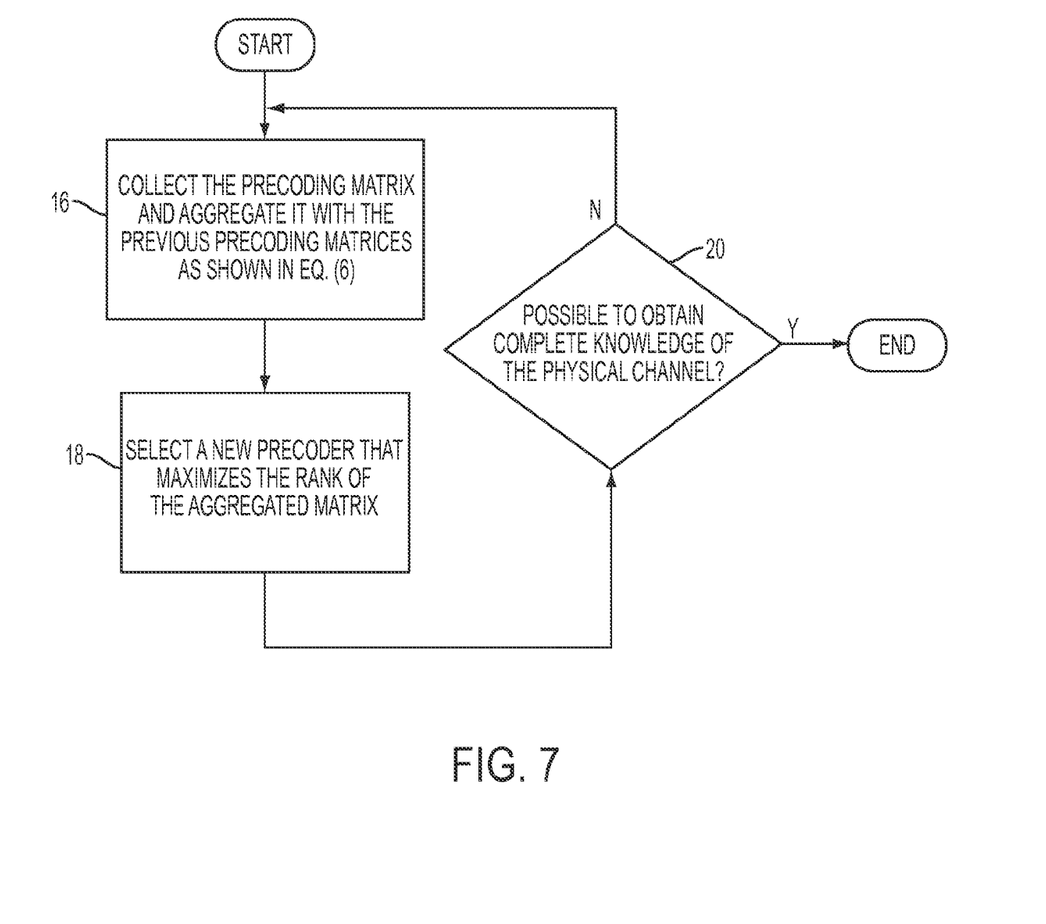
FIG. 7 depicts a method for determining a precoding pattern according to exemplary embodiments.

According to exemplary embodiments, methods can be used for determining a precoding pattern which uses the afore-described principles. A purely illustrative method for determining a precoding pattern according to an embodiment is shown in FIG. 7 and will now be described. At step 16 collect the precoding matrix and aggregate it with the previous precoding matrices as shown in equation (6); at step 18 select a new precoder that maximizes the rank of the aggregated matrix, and at step 20 determine if it is possible to obtain complete knowledge of the physical channel. If it is possible then the process ends, and if it is not possible, then the process iterates beginning again with step 16. As described above, it is possible to replace the rank by the orthogonality at step 18, if the target is to improve the estimation quality.

Returning now to the collected precoding matrices, according to exemplary embodiments, the dependent columns of the collected precoding matrices effectively play a role of time averaging since they provide multiple copies of the same equivalent channel over a noisy channel. For example, if the DM-RS is precoded with the 0-th rank-1 precoding matrix in the third subframe, i.e., N=3, it follows that:

$$(W_1\ W_2\ \ldots\ W_N) = \frac{1}{\sqrt{2}}\begin{pmatrix} 1 & 1 & 1 \\ 1 & -1 & 1 \end{pmatrix} \quad (10)$$

and $$(W_1\ W_2\ \ldots\ W_N)^+ = \frac{1}{\sqrt{2}}\begin{pmatrix} 0.5 & 0.5 \\ 1 & -1 \\ 0.5 & 0.5 \end{pmatrix} \quad (11)$$

Note that equation (7) can be expressed as:

$$h\_1 = 1/\text{sqrt}(2)*(0.5*E\_1 + E\_2 + 0.5*E\_3) \quad (12)$$

and $$h\_2 = 1/\text{sqrt}(2)*(0.5*E\_1 - E\_2 + 0.5*E\_3) \quad (13)$$

which implies time averaging over $E\_1$ and $E\_3$. According to another exemplary embodiment, if the rank of the collected precoding matrix is greater than the number of transmit antennas, in an over-determined linear system it is also possible to remove less reliable columns. Additionally, in the previous described exemplary embodiments it has been assumed that a single DM-RS is transmitted at every subframe, however, according to other exemplary embodiments if more than one DM-RS is transmitted within a subframe, as occurs in LTE UL, the additional DM-RSs can also play a role of time-averaging in a manner similar to that described above.

Previous exemplary embodiments have generally been described with respect to using the channel of a certain subcarrier alone. However, according to exemplary embodiments, for link adaptation purposes it is typically necessary to estimate the channel of all of the subcarriers within the bandwidth over which PUSCH are to be transmitted. Since some contiguous subcarriers, within the coherence bandwidth, experience the same channel it is possible to collect all of the equivalent channels of the subcarriers (similar to equation (6)) and to obtain the physical channel common to those subcarriers. Additionally, if the same precoding is applied to all the subcarriers and the least square estimation is applied, similarly to that shown in equation (7), the physical channel can be obtained by using a frequency average.

According to exemplary embodiments, by forcing a UE 12 to follow a specific precoder pattern, e.g., 0-1-0 in the previous example, it is possible to obtain the physical channel. Once the physical channel is obtained, it is possible to predict the SINR and/or throughput of all of the precoding matrices of the codebook and consequently to then select the precoder (including rank and precoding matrix) that maximizes the SINR and/or throughput. The precoder may also have multiple ranks. For example, in the case of the codebook 4 shown in FIGS. 2-4 the pattern consisting of the 0-th rank-2 precoding matrix and the 4-th rank-2 precoding matrix provides complete knowledge of the physical channel. Thus, for a given $N_T$ the precoding pattern of a higher rank can be shorter so that, e.g., the precoding pattern leads to less overhead associated with the forced precoder pattern and/or it is more robust to time variation of channel.

For example, the full rank precoding matrices of the codebooks 2, 4 shown in FIGS. 1-4, with the precoding matrices in the right-most column, do not virtually precode DM-RS, since they are identity matrices, and provide complete knowledge about the channel. However, since the higher rank precoding is more suitable for high SNR environments, it may be necessary, according to exemplary embodiments, to force a UE 12 to follow the lower-rank precoder pattern at low-to-medium SNR. The precoder pattern of different ranks provides the tradeoff between the completeness of knowledge of the physical channel, e.g., the rank of the collected equivalent channel, the Doppler spread, etc., and the SINR or throughput of the subframes where a UE 12 is forced to follow the precoder pattern. In other words, the selection of a lower rank precoder may lead to a better SINR and/or a higher throughput, particularly for medium-to-low SNRs, even though it may take more time until the NodeB can obtain the complete knowledge of the physical channel.

According to exemplary embodiments which use DM-RS, by forcing the UE 12 to follow a specific pattern of the same rank and allowing the NodeB to collect data from the received DM-RS of the relevant CSI, the complete knowledge of the physical channel can be obtained. The length of precoder pattern can be determined by considering rank and Doppler spread. For example, for the codebook 2 of FIG. 1, a few of the rank-1 precoder patterns consisting of two subframes, e.g., "0-1", "2-3" and "4-5", provide complete knowledge of the physical channel. Also the rank-2 precoder pattern "0", which includes a single subframe, has the same effect in terms of providing complete knowledge of the physical channel.

Regarding the codebook 4 shown in FIGS. 2-4, the rank-1 pattern which includes four subframes, e.g., "16-17-18-19", allows for obtaining the physical channel. Similarly, there exist the rank-2 patterns of three subframes, the rank-3 patterns of two subframes, and a rank-4 pattern of one subframe. Additionally, according to exemplary embodiments, some precoder patterns provide extra information that can be used to enable time-averaging and it is possible to remove the less reliable columns of the collected precoder as desired.

According to another exemplary embodiment which uses DM-RS, precoder patterns of different rank can be used. For example, for the codebook 4 of FIGS. 2-4, the precoder patterns "0(3)-4(2)" (the number inside the parenthesis denotes the rank of the precoder pattern) provides complete knowledge of the physical channel as well as allows for time averaging as described above.

According to exemplary embodiments, there are some scenarios when the precoder pattern is not set to provide the complete knowledge of the physical channel. For example, this can occur when, for example, it is not possible to force the UE 12 to follow a specific precoding pattern. For another example of when the precoder pattern is not set to provide the complete knowledge of the physical channel, this can occur when the channel varies with time so rapidly that some of the collected equivalent channels are already outdated. For this case, it is possible to utilize the incomplete precoder pattern to predict the SINR or throughput of a subset of codebook and select the SINR-maximizing or throughput maximizing precoder within the subset. According to exemplary embodiments, this can lead to higher throughput as compared to staying with the same precoder since the subset inherently includes the current precoder. In the sense that the next precoder is dependent on the collected equivalent channels, it is possible to adapt the precoder pattern, depending on the channel condition. According to exemplary embodiments, the adaptation rule can consider the trade-off between the completeness of knowledge of the physical channel, e.g., the rank of the collected equivalent channel, the Doppler spread, etc., and the SINR or throughput of the subframes where the UE 12 is forced to follow the precoder pattern.

Previous exemplary embodiments, have generally described the use of DM-RS for link adaptation purposes. However, according to exemplary embodiments, the proposed precoder selection can be combined with the conventional SRS based precoder selection when desired. DM-RS and SRS can be jointly used for precoder selection under, for example, the following conditions: (1) if the DM-RS is transmitted with sufficiently accurate power control, (2) if the relevant CSI is not outdated, (3) if the SRS bandwidth is not disjointed with the DM-RS bandwidth, and (4) if the time averaging can be applied over the shared bandwidth in order to improve the estimation quality. Otherwise, SRS can be used for obtaining the out of band physical channel while DM-RS can be used for obtaining the in band equivalent channel. As a result, there can be no need to use SRS for in band channel estimation, which can lead to a higher SRS capacity.

According to exemplary embodiments, it is possible to obtain complete or partial knowledge of the physical channel without forcing the UE 12 to follow a specific precoder pattern and allowing the NodeB to collect all relevant CSI. In this embodiment, the NodeB is able to predict the equivalent channels of a subset of the codebook which enable suboptimal precoder selection. For example, it is possible to select the precoding matrix that maximizes the SINR or throughput in the subset. The number of subframes collected for obtaining the physical channel can be determined by considering the Doppler spread. Additionally, it is possible to adapt the precoder pattern, depending on the channel condition, in order to improve the SINR or throughput of the subframes where the precoder pattern is forced.

For example, the codebook 4 shown in FIGS. 2-4, a single DM-RS precoded with "0(3)" enables the system to obtain the equivalent channels for "0(1)", "1(1)", "2(1)", "3(1)", "0(2)", "1(2)", etc., although it is impossible to obtain the physical channel. Also, the two DM-RSs precoded with "16(1)-20(1)" make it possible to obtain the equivalent channel for "8(2)". Therefore, if it is determined that the equivalent channel corresponds to "16(1)" or "20(1)", then "8(2)" can be selected as the next precoding matrix and the rank increases from 1 to 2.

According to another exemplary embodiment, the variation of the transmitter imbalance between the SRS and the DM-RS transmissions can be estimated and used when precoder selection is performed. In this so-called "SRS Imbalance Suppression" method, the received symbol for a single subcarrier for a DM-RS and a SRS transmission can be denoted as follows in equations (14) and (15):

$$r_D = HDWs + n = H'Ws + n \quad (14)$$

and $$r_S = HD_S p + n = H'D'_S p + n \quad (15)$$

In equations (14) and (15), $H'=HD$ is the channel for DM-RS, $HD_S = H'D'_S$ is the channel for SRS, $D'_S = D^{-1} D_S$ is the variation of the transmitter imbalance between DM-RS and SRS, and n is the impairment from noise and interference. The subscript "D" refers to DM-RS, the subscript "S" refers to SRS and "s" and "p" refer to the transmitted DM-RS and SRS symbols, respectively. The transmitter imbalance is assumed to be frequency independent.

Assuming that the SRS and the DM-RS signals are received closely enough in time so that the channel remains constant between the two signals, an exemplary embodiment may require the estimation of H' and $D'_S$ from the above received signals. All of the other quantities, except noise and interference, are generally known. In this example, both H' and $D'_S$ for a set of subcarriers are estimated using the received symbols $r_D$ and $r_S$ for the set of subcarriers. The knowledge of $D'_S$ is then used to estimate the channel for frequency subcarriers where no DM-RS are transmitted but SRS signals are transmitted while reducing, or completely removing, the bias due to antenna imbalances. Thus, the transmitter imbalances $D'_S$ are considered to be known when estimating the channel H' for other frequency subcarriers. This allows the NodeB to perform frequency dependent scheduling based on more accurate channel information even in the presence of inter-transmitter imbalance. Additionally, the quality of the channel estimate where the DM-RS are transmitted is also potentially enhanced due to SRS measurement.

According to exemplary embodiments, while many estimators such as a maximum-likelihood (ML) or minimum mean-square error (MMSE) estimator may be used to estimate H' and $D'_S$, those skilled in the art will recognize that other sub-optimal estimators may be used as well. For example, H' could first be estimated using the received signal from the DM-RS and then $H'D'_S$ could be estimated from the received signal from the SRS. The antenna imbalance $D'_S$ could then be estimated directly from these two estimates.

Figure 8:
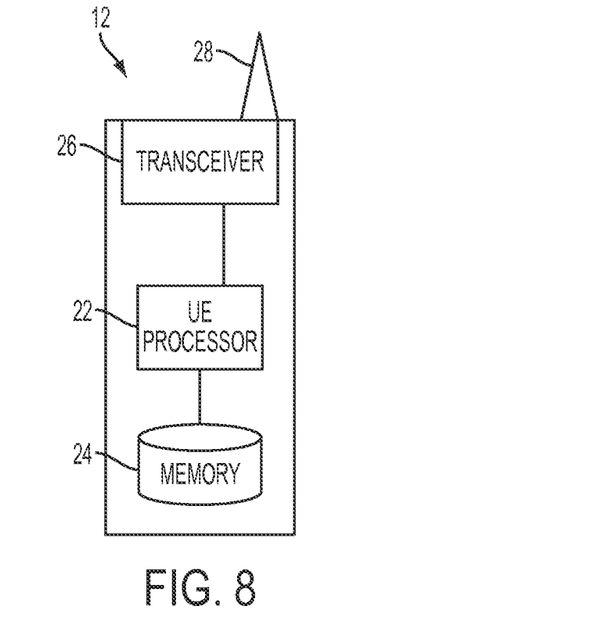
FIG. 8 shows a UE according to exemplary embodiments.

UEs 12 and base stations 8 can be used in support of the exemplary embodiments described herein. An exemplary UE 12 is shown in FIG. 8 and includes a processor 22, a memory 24, a transceiver 26 and one or more antenna 28. As desired, according to exemplary embodiments, some or all of the functionality described above as being provided by mobile communication devices or other forms of UE 12 may be provided by the UE's processor 22 by executing instructions stored on a non-transitory computer-readable medium, such as the memory 24 shown in FIG. 8. Alternative exemplary embodiments of the UE 12 may include additional components beyond those shown in FIG. 8 that may be responsible for providing certain aspects of the UE's functionality, including any of the functionality described above and/or any functionality necessary to support the exemplary embodiments described herein.

Figure 9:
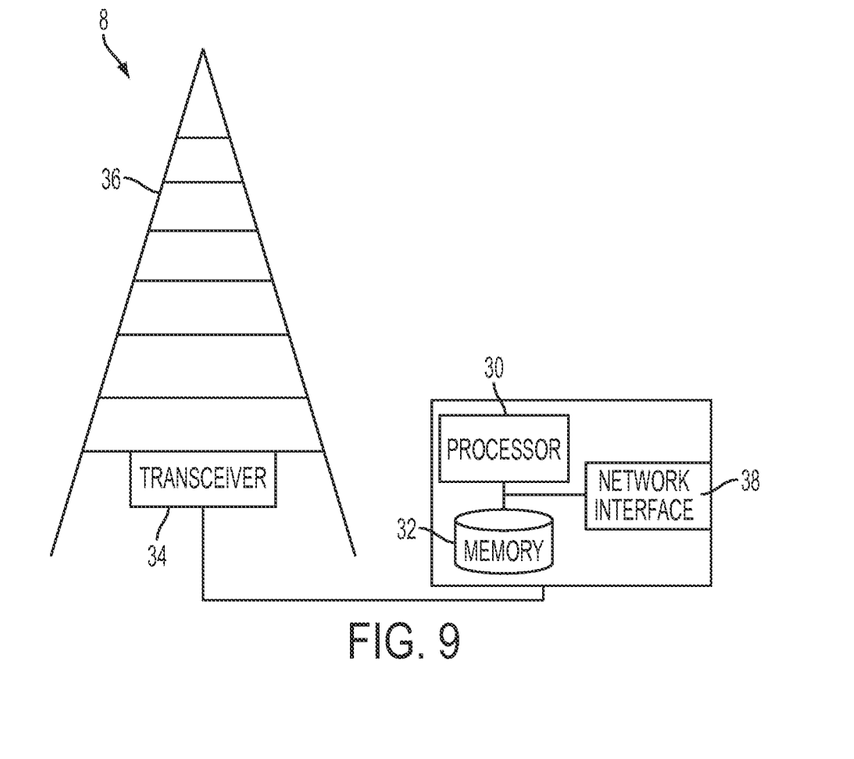
FIG. 9 illustrates a base station according to exemplary embodiments.

An exemplary base station 8 is shown in FIG. 9 and includes a processor 30, a memory 32, a transceiver 34, one or more antenna 36 and a network interface 38. As desired, according to exemplary embodiments, some or all of the functionality described above as being provided by a mobile base station, a base station controller, a NodeB, an eNB and/or any other type of mobile communications node may be provided by the base station's processor 30 by executing instructions stored on a non-transitory computer-readable medium, such as the memory 32 shown in FIG. 9. Alternative exemplary embodiments of the base station 8 may include additional components beyond those shown in FIG. 9 that may be responsible for providing certain aspects of the base station's functionality, including any of the functionality described above and/or any functionality necessary to support the exemplary embodiments described herein.

Figure 10:
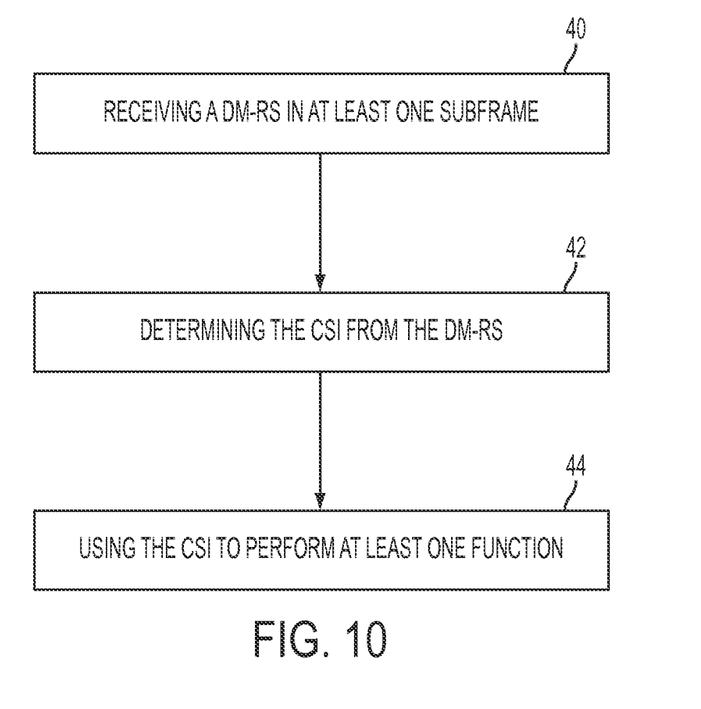
FIG. 10 shows a flowchart of a method according to exemplary embodiments.

Utilizing the above-described exemplary system according to exemplary embodiments, a method for using DM-RS is shown in the flowchart of FIG. 10. Initially a method for using a DM-RS to obtain CSI for precoder selection includes: at step 40 receiving a DM-RS in at least one subframe; at step 42 determining the CSI from the DM-RS; and at step 44 using the CSI to perform at least one function. The CSI can, for example, be used for one or more of the following functions: scheduling, link adaptation, power control, timing updates and precoder selection. Thus, although the foregoing exemplary embodiments focused on precoder selection, the present invention is not limited thereto.

The above-described exemplary embodiments are intended to be illustrative in all respects, rather than restrictive, of the present invention. Thus the present invention is capable of many variations in detailed implementation that can be derived from the description contained herein by a person skilled in the art. No element, act, or instruction used in the description of the present application should be construed as critical or essential to the invention unless explicitly described as such. Also, as used herein, the article "a" is intended to include one or more items.

What is claimed is:

1. A method for using demodulation reference signals (DM-RSs) to obtain channel state information (CSI) for precoder selection, the method comprising:
   receiving a DM-RS at a base station in at least one subframe from a user equipment (UE);
   determining CSI based on the DM-RS;
   demodulating user data received during the subframe using the DM-RS;
   using the CSI obtained from the DM-RS to perform at least one function; and
   predicting, without forcing the UE to follow a specific precoder pattern, equivalent channels of a subset of a codebook, given a series of CSI measurements.

2. The method of claim 1, wherein said at least one function includes one or more of: scheduling, link adaptation, power control, timing updates and precoder selection.

3. The method of claim 1, further comprising:
selecting a precoder matrix that maximizes at least one of signal-to-interference plus noise ratio and throughput in the subset.

4. The method of claim 1, wherein a set of subframes collected for obtaining the physical channel is determined in part by a Doppler spread.

5. The method of claim 1, further comprising:
storing, by a UE, previously measured channel information.

6. The method of claim 1, further comprising:
estimating a variation of a transmitter imbalance between sounding reference signal (SRS) transmissions and DM-RS transmissions; and
using the estimate of the variation of the transmitter imbalance when the CSI is used.

7. A base station for using demodulation reference signals (DM-RSs) to obtain channel state information (CSI) for precoder selection, the base station comprising:
a transceiver configured to receive a DM-RS in at least one subframe; and
a processor configured to:
determine CSI based on the DM-RS, demodulate user data received during the subframe using the DM-RS; and
use the CSI obtained from the DM-RS to perform at least one function,
wherein the processor is configured to predict, without forcing a UE to follow a specific precoder pattern, equivalent channels of a subset of a codebook, given a series of CSI measurements.

8. The base station of claim 7, wherein the at least one function includes one or more of scheduling, link adaptation, power control, timing updates and precoder selection.

9. The base station of claim 7, wherein the processor is configured to select the precoder matrix that maximizes at least one of signal-to-interference plus noise ratio and throughput in the subset.

10. The base station of claim 7, wherein the number of subframes collected for obtaining the physical channel is determined in part by a Doppler spread.

11. The base station of claim 7, wherein a UE stores previously measured channel information.

12. The base station of claim 7, wherein the processor is configured to estimate a variation of a transmitter imbalance between sounding reference signal (SRS) transmissions and DM-RS transmissions and to use the estimation when the CSI is used.

13. The base station of claim 7, wherein the base station is one of a NodeB or an eNodeB.

* * * * *

UNITED STATES PATENT AND TRADEMARK OFFICE
CERTIFICATE OF CORRECTION

PATENT NO. : 9,191,087 B2  
APPLICATION NO. : 14/175318  
DATED : November 17, 2015  
INVENTOR(S) : Park et al.

Page 1 of 1

It is certified that error appears in the above-identified patent and that said Letters Patent is hereby corrected as shown below:

In the specification,
In Column 1, Line 8, delete "2011," and insert -- 2011, now Pat. No. 8,649,423, --, therefor.

Signed and Sealed this
Twenty-second Day of March, 2016

Michelle K. Lee
*Director of the United States Patent and Trademark Office*